(No Model.) 2 Sheets—Sheet 2.
M. J. MOHAN.
SIDE SADDLE TREE.
No. 406,108. Patented July 2, 1889.
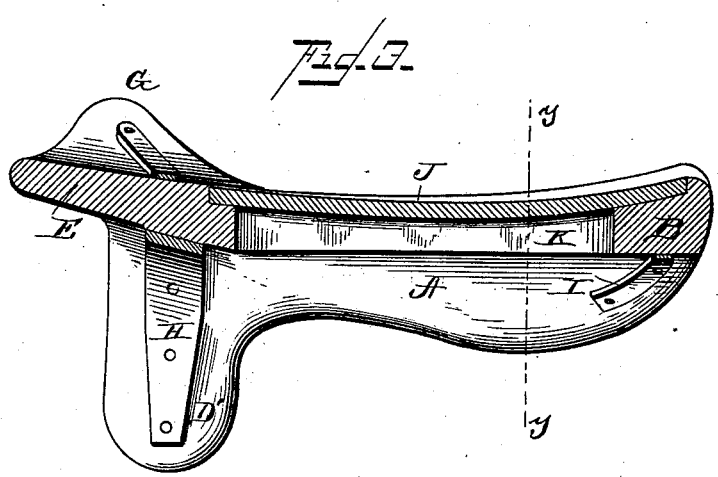
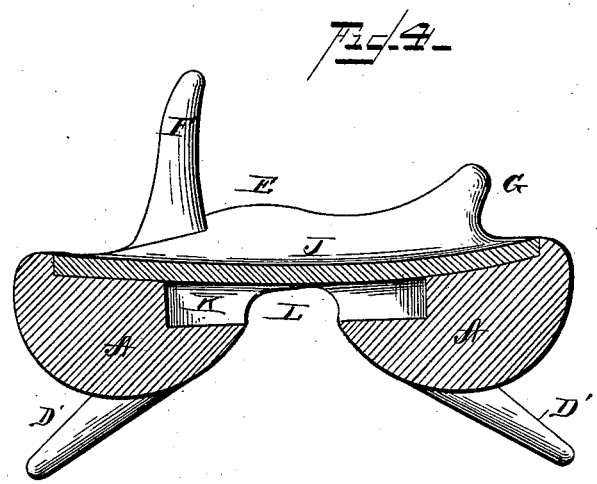

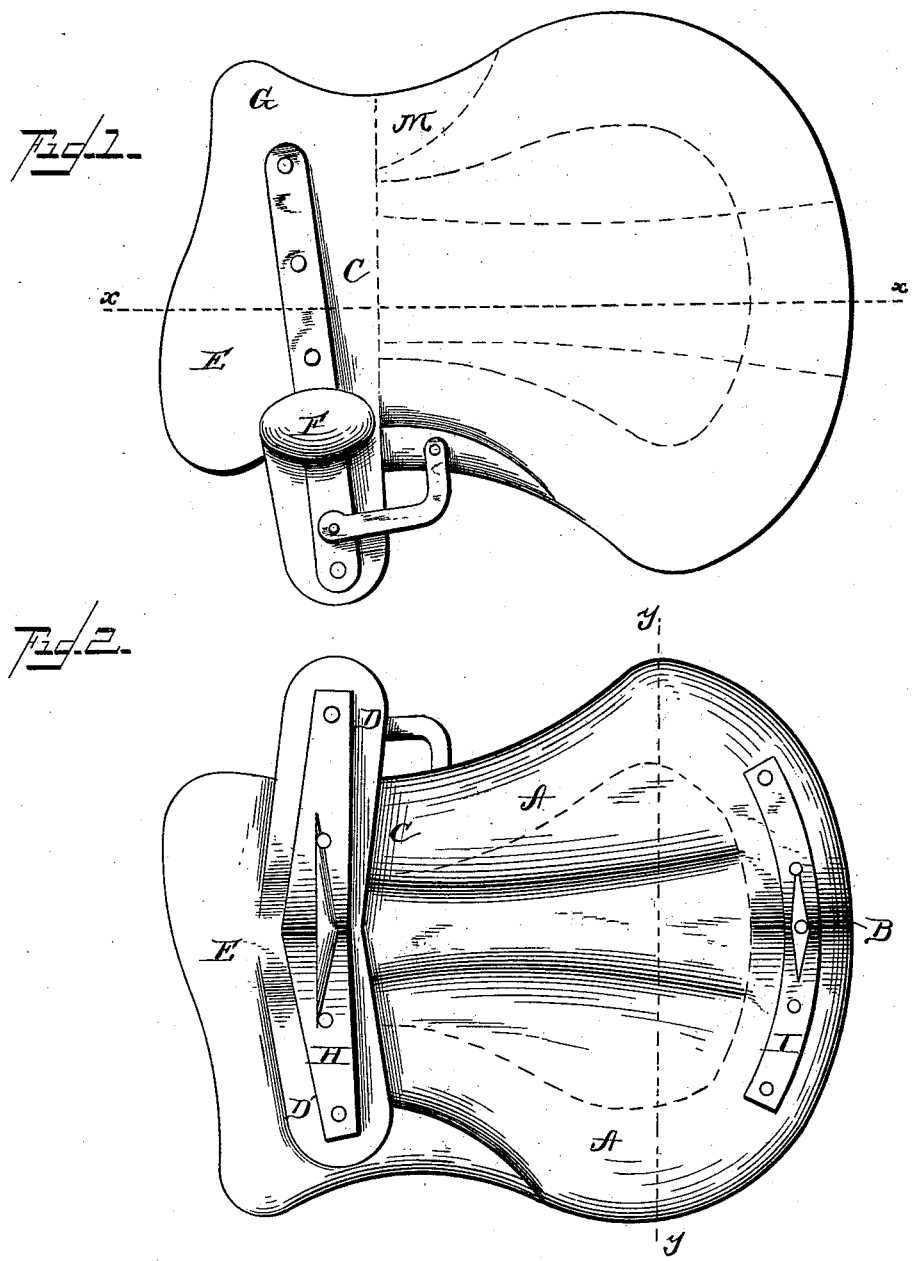

UNITED STATES PATENT OFFICE.

MICHAEL J. MOHAN, OF COVINGTON, KENTUCKY.

SIDE-SADDLE TREE.

SPECIFICATION forming part of Letters Patent No. 406,108, dated July 2, 1889.

Application filed December 28, 1888. Serial No. 294,899. (No model.)

*To all whom it may concern:*

Be it known that I, MICHAEL J. MOHAN, of Covington, in the county of Kenton and State of Kentucky, have invented a new and useful Improvement in Side-Saddle Trees, which improvement is fully set forth in the following specification and accompanying drawings, in which—

Figure 1 is a top view of my improved side-saddle; Fig. 2, a view of the under side of the saddle. Fig. 3 is a vertical longitudinal section across line *x* of Fig. 1, and Fig. 4 is a cross vertical section through line *y* of Fig. 2.

The object of my invention is to make a side-saddle tree so that the entire skeleton will be of the proper shape and form for a complete saddle, and will require no stuffing or padding preparatory to covering the same with leather or other material usually employed for this purpose.

My invention consists in certain details of construction, hereinafter particularly described and claimed.

In the drawings, A A represent the side bars of the saddle-tree, as shown by the view of the under side, Fig. 2, having the rear cantle B, as usually made. The forward ends of the side bars are attached to the front cross-head C, from which the bars D D' project downwardly.

E represents the front spring of the tree, which extends forward of the horns F G. The horn F may be integral with the bar D or mortised into the cross-head C. The front spring of the tree is an extension of the cross-head C, as shown in Figs. 1 and 2. These parts are all made of wood, and are re-enforced on the under side of the tree with metal strips H I, as shown.

By reference now to Figs. 3 and 4 it will be seen that the side bars are rabbeted on their upper sides to receive a seat J. This seat is thin, so as to add but little weight to the saddle, and is put in by the saddle-tree manufacturer. It is therefore a permanent part of the saddle. Beneath the saddle and on the inner sides of the side bars the latter are gained to form recesses K. This secures lightness, and also forms an air-space.

As the lower side of the seat J is elevated above the floor of the gain and is rigid, the backbone of the animal cannot come in contact with the seat.

It is of course necessary that the vertical thickness of the side bars A should be greater than the ordinary side bar, so as to give room in the arch L for any animal, however high the backbone may project.

This invention is not designed to provide for the manner of covering the tree with leather or other material; but it should be observed that in the process of putting on the covering in the old way every part of the tree has to be padded and built up with straw, hair, or other filling material covered with burlap or other like material, so as to form a saddle of the proper shape, size, and curvature, after which the outer covering of leather is put on. In my invention all this work is unnecessary, since the tree itself is constructed with the proper outlines, thus enabling any ordinary workman to put on the covering. With the old style of saddle-tree the most skillful workman is required to finish the saddle or to stuff and cover it. It is also obvious that in dispensing with the padding material a great saving is effected, besides the labor. I also especially call attention to the fact that as both the front bow E and the off-horn G are integral with the front cross-bar C the covering material can be rigidly attached to the spring E, and the shape and curvature of the off-horn G enables it to be covered with ease and without a waste of material.

I am aware of the patents granted to Whitman May 31, 1881, No. 242,175, and Dixon and Williamson June 21, 1881, No. 243,227, for improvements in saddle-trees, and of course do not herein claim what they show and describe.

What I claim as new is—

The herein-described improved side-saddle, composed of the side bars A, having recesses K, cut or rabbeted into their upper adjacent faces, thereby affording a free and extended ventilating-space below the seat, the cantle B, connecting the rear ends of said side bars, the front cross-bar C, connecting the forward ends of said bars provided with the horns F and G, and the front bow E and the veneer seat J, secured to said side bars, cantle, and front bar, affording a broad continuous seat, substantially as shown and described.

In testimony that I claim the foregoing I have hereunto set my hand, this 27th day of February, 1888, in the presence of witnesses.

MICHAEL J. MOHAN.

Witnesses:
EDWARD BARTON,
R. S. MILLAR.